United States Patent [19]

Ferguson et al.

[11] 3,930,236

[45] Dec. 30, 1975

[54] SMALL MICRO PROGRAM DATA PROCESSING SYSTEM EMPLOYING MULTI-SYLLABLE MICRO INSTRUCTIONS

[75] Inventors: Alisdair Cullen Ferguson, Bathgate; John McGregor, Currie; Alastair George MacPherson, Linlithgow, all of Scotland

[73] Assignee: Burroughs Corporation, Detroit, Mich.

[22] Filed: Oct. 2, 1973

[21] Appl. No.: 402,724

[30] Foreign Application Priority Data

June 5, 1973 United Kingdom .............. 26716/73

[52] U.S. Cl. ........................................ 340/172.5

[51] Int. Cl.² ........................ G06F 9/16; G06F 9/10

[58] Field of Search ........... 340/172.5; 444/1; 445/1

[56] References Cited

UNITED STATES PATENTS

| | | | |
|---|---|---|---|
| 3,340,513 | 9/1967 | Kinzle et al. | 340/172.5 |
| 3,477,063 | 11/1969 | Anderson et al. | 340/172.5 |
| 3,665,411 | 5/1972 | O'Connor | 340/172.5 |
| 3,678,467 | 7/1972 | Nussbaum et al. | 340/172.5 |
| 3,702,988 | 11/1972 | Haney et al. | 340/172.5 |
| 3,736,567 | 5/1973 | Lotan et al. | 340/172.5 |
| 3,739,345 | 6/1973 | Janssens et al. | 340/172.5 |

*Primary Examiner*—Mark E. Nusbaum
*Attorney, Agent, or Firm*—Mervyn L. Young

[57] ABSTRACT

A micro program system is disclosed which employs two levels of subinstruction sets. The first level of subinstructions, or micro instructions, is implemented by a second level of control instructions that can be stored in a processor read-only memory. The respective micro instructions are made up of varying numbers of syllables according to the function of the particular micro instructions. The various types of micro instruction syllables are stored in a micro instruction memory to be fetched therefrom in sequence in accordance with the requirements of a particular macro instruction or subject instruction. In this manner, a variety of micro instructions can be created by selecting a plurality of different syllables from the micro instruction memory. A different micro instruction syllable is provided to specify each combination of the function to be performed and the source and destination registers to be used with the particular buses in the processor.

4 Claims, 13 Drawing Figures

SMALL MICRO PROGRAM DATA PROCESSING SYSTEM EMPLOYING MULTI-SYLLABLE MICRO INSTRUCTIONS

RELATED U.S. PATENT APPLICATIONS

U.S. patent applications directly or indirectly related to the subject application include the following:

Ser. No. 402,747 filed Oct. 2, 1973 by A. C. Ferguson et al and titled "A Micro Program Data Processor Having Parallel Instruction Flow Streams For Plural Level of Subinstruction Sets," now U.S. Pat. No. 3,886,523.

BACKGROUND OF THE INVENTION

1. Field of Invention

This invention relates to a small data processing unit for business and communications applications and more particularly to a small micro program processing unit adapted to implement programs written in higher level program languages.

2. Description of the Prior Art

Many business enterprises do not always have sufficient data processing requirements to justify the employment of a full-scale general purpose data processing system. Often the requirements of such companies can be fulfilled by electronic accounting and billing machines which can be considered to be small special purpose computers. On the other hand, such small special purpose computers, as existed in the prior art, are too limited in capability to accept programs that have been written in the so called higher level program languages.

An alternative method of handling data processing requirements of small or medium sized enterprises is that of having on-site remote terminals which are coupled to a distant large scale data processing system in a time-sharing manner. In many instances, the data processing requirements of a particular business will be a mix of accounting and billing tasks, and also of other processes which require a larger computational capability. To meet this situation terminal processors are provided which not only allow for the time sharing of a larger computer, but which are also capable of performing specific processing routines. In the case of terminal processors, as well as small business processors, emphasis is placed on the cost of the system so as to make the system available to a wide variety of smaller companies. In the past, this has limited the ability of the user to move to full-scale general purpose data processing systems, as such a system's change as required the conversion of the user's previous programs to the more flexible languages for which the larger system is adapted.

In the past, the lack of program compatibility existed to some degree between systems from the same manufacturing source, but was even more acute between systems built by different companies, since different designers employ different instruction formats which differ in length; and also employ different field sizes within the instruction format. To overcome such differences in "machine languages", a variety of different higher level programming languages were developed, among the more common of which are Fortran, Cobol and Algol. Programs written in such programming languages could be encoded and used in different computer systems; however, such programs had to first be translated into the machine language of the particular system which translation was performed by a systems program sometimes called a compiler, and if such a compiler had not been provided for particular programming language, then the computer user would have to rewrite his program in a language for which the system did have a compiler.

A particular manner that may be employed to readily accommodate programs written in different higher level languages has been that of micro programming. At one time, micro programming was considered as an engineering design tool whereby the machine instruction wired decoder was replaced by a table look-up memory containing various sets of control signals as required to condition the various gates and registers for data transfer as specified by the machine language instruction. In this manner, the machine language instruction was executed by sequencing through a plurality of locations in the table look-up memory. In more sophisticated processors, the number of gates and registers involved are increased in number with a proportionate increase in the number of control signals to be stored and a resultant increase in the size and cost of the table look-up memory. In order to reduce the size of the table look-up memory, the respective sets of control signals are encoded in binary code to become what is generally referred to as micro operators or micro instructions that are then decoded by a wired decoder which, nevertheless, is less expensive than a wired decoder required for a machine language instruction.

The wide use of large scale integrated circuitry has made it practical to implement the micro instruction memory as a read-write memory. This, in turn, allows the particular sets of micro instructions stored in that memory to be dynamically changed so as to free the processor from limitations upon its functions and capabilities. With such variable micro programming, the processor is not restricted to one particular machine language or subject instruction format. Since no one subject instruction format is preferred, that format cna now be chosen in accordance with any program requirement and can even be the format of any particular higher level language. However, even with large scale integrated circuit chips, the size and, therefore, the cost of the variable micro program memory is still in excess of what is required for the processor to be priced for the market of present-day electronic accounting and billing machines.

It is, then, an object of the present invention to provide an inexpensive data processor that can never theless accommodate programs written in higher level program languages.

It is another object of the present invention to provide a micro program data processor requiring a relatively simple and inexpensive micro instruction memory requirement.

It is still another object of the present invention to provide a micro program data processor allowing for micro instruction code compaction.

SUMMARY OF THE INVENTION

To achieve the above-described objects, the present invention resides in the system, and the method employed in that system, which includes a micro program processor that is driven by micro instructions made up of varying numbers of syllables, depending upon the function and literal values required. The processor employs two levels of subinstruction sets by which macro or subject instructions are implemented by strings of micro instructions all of which are in turn implemented by control instructions. Each level of instruction sets may be stored in separate portions of memory, or even separate memories, with the control instructions being stored in a read-only memory internal to the processor.

The various types of micro instruction syllables are stored in the micro memory, respective syllables being selected and fetched in sequence from that memory to form the different micro instructions as required. The selection of particular ones of the different types of micro instruction syllables in turn serves to specify the particular combination of function to be performed, the source and destination registers to be employed, the particular data buses in the processor to be used for data transfer and also the timing of micro instruction execution.

A feature, then, of the present invention resides in a micro programmed processing system wherein respective micro instructions are formed of varying numbers of micro instruction syllables, with the various types of syllables being stored in a micro instruction memory and fetched in sequence to form the particular micro instruction. One syllable of each micro instruction is selected to indicate the particular combination of the function to be performed, the source and destination registers to be employed, the particular buses which are to be used for data transfer and the timing of micro instruction execution, i.e. the number of characters, digits, or bits to be operated upon during the micro instruction execution. When the particular micro instruction is formed of more than one syllable, the remaining syllables represent values or literals used as address parameters and also for logical operations.

DESCRIPTION OF THE DRAWINGS

The above and other objects, advantages and features of the present invention will become more readily apparent from a review of the following specification when taken in conjunction with the drawings wherein.

GENERAL DESCRIPTION OF THE SYSTEM

As was described in the above background, objects and summary of the present invention, the present application is directed toward an inexpensive system to fulfill the requirements both of electronic accounting and billing machine markets, and also the markets for a small general purpose data processing system. More specifically, however, the system of the present invention is designed to accommodate programs written in higher level programming languages, such as Cobol. To this end, the system of the present invention is a micro program system wherein such higher level program language instructions are interpreted by strings of micro instructions. In order to reduce the cost of the micro instruction decoder and also to provide greater flexibility for micro instruction execution, the respective micro instructions are in turn implemented by control instructions which comprise sets of signals as required to condition the various gates and registers for data transfer. To further reduce the cost of the system, that system is adapted to accommodate micro instructions of variable numbers of basic micro instruction syllables, which syllables may be transferred sequentially, thereby reducing the necessity for large data path widths in the processor and processor-memory interface.

The system of the present invention is one which is controlled by micro instructions that are, in turn, implemented by control instructions. That is to say all data moves are executed under the control of control instructions that have been called for by micro instructions.

Since the variable length micro instructions are to be made up of syllables including an operation code and different literal values, the system of the present invention is adapted to store the respective syllables with the desired micro instructions being formed by fetching the appropriate syllables in sequence from the micro program memory. This technique achieves code compaction in the micro store and eliminates redundancy. The micro programmer is allowed to choose the respective micro operation code syllables, as required to specify source and destination registers, as well as function to be performed.

Figure 1:
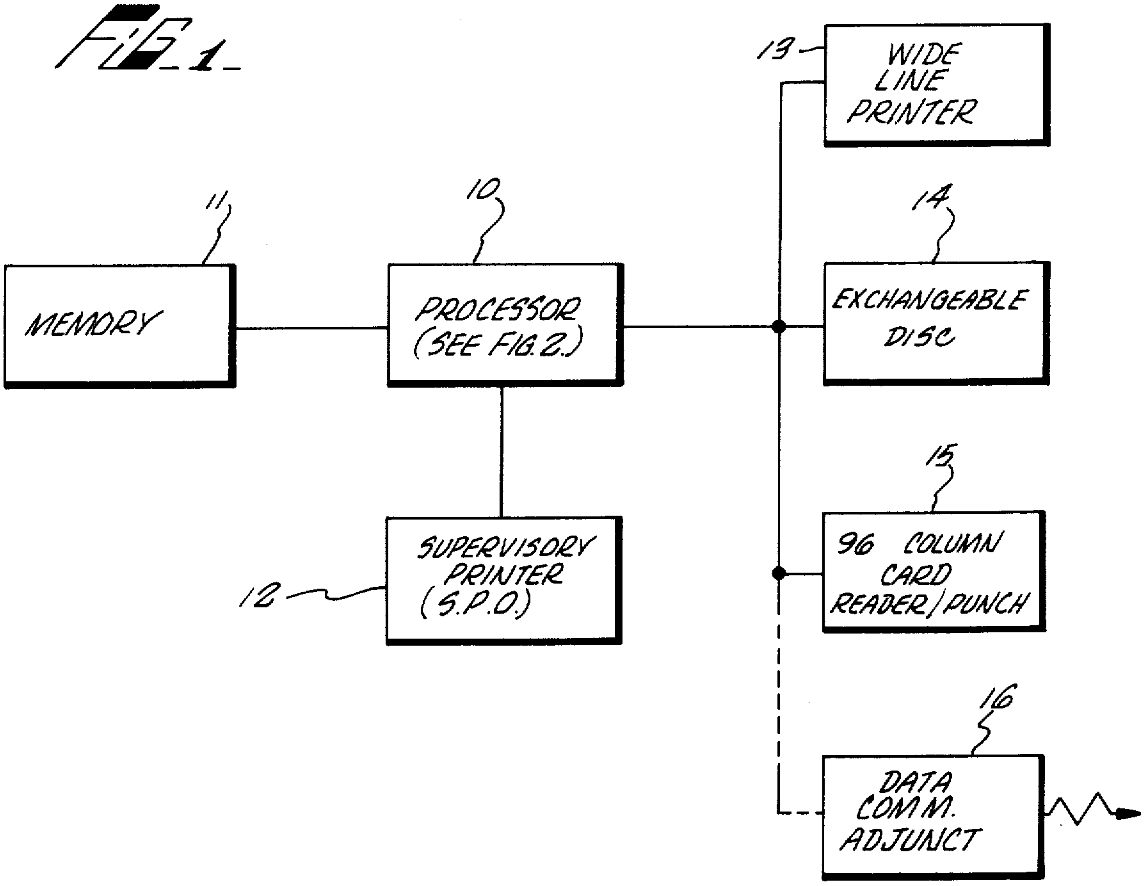
FIG. 1 is a schematic diagram of a system employing the present invention.

A system which may employ the present invention is illustrated in FIG. 1, which may be a small, but nevertheless a programmable, general purpose data processing system. As illustrated in FIG. 1, a system includes processor 10 which is adapted to communicate with memory 11 and supervisory printer 12, as well as a host of peripherals including line printer 13, disk 14, card reader-punch 15 and even data communication controller 16 through a common interface to each peripheral unit.

Figure 2:
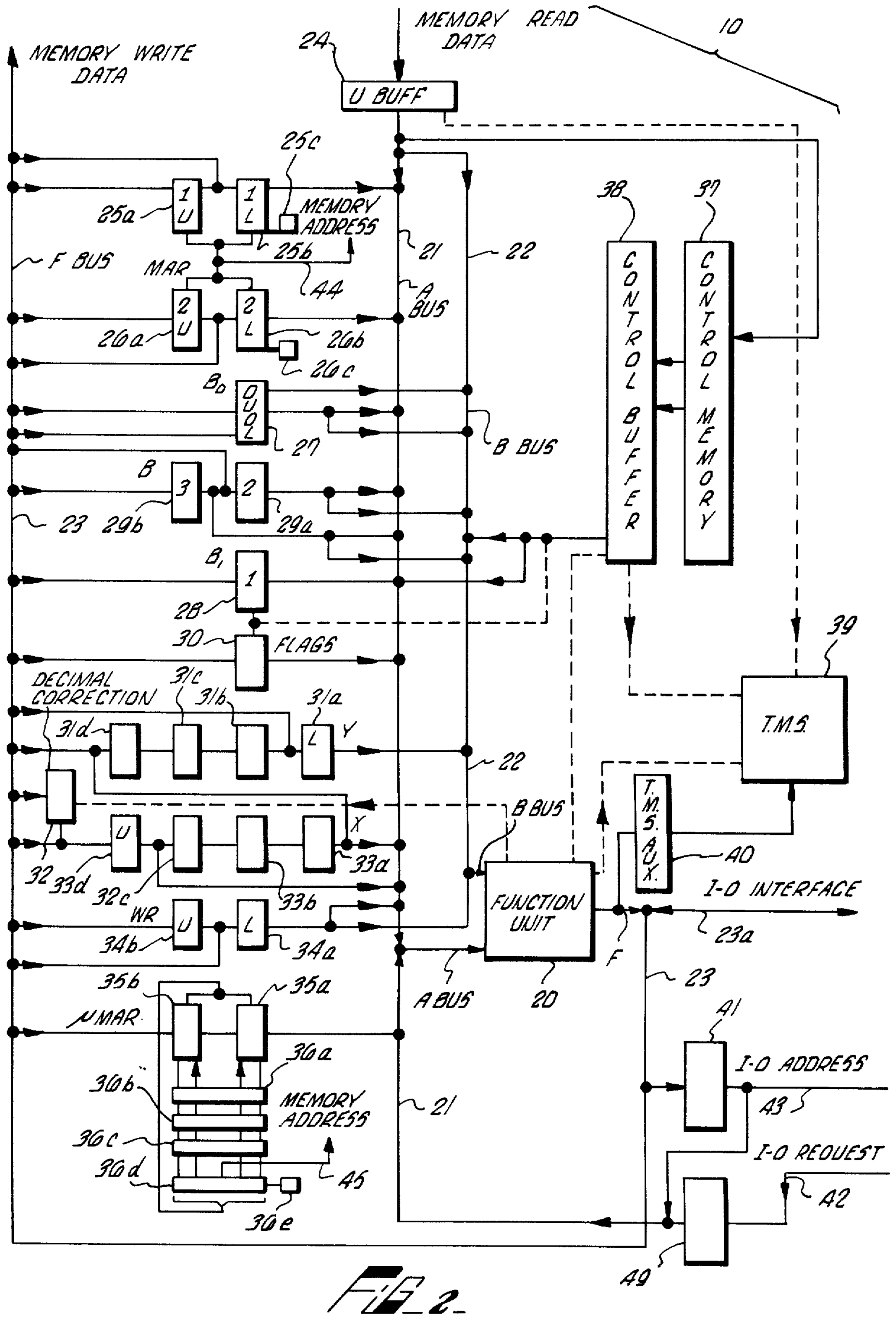
FIG. 2 is a schematic diagram of the processor of the present invention.

The processor of the present invention is illustrated in FIG. 2 which will now be briefly described. As illustrated therein, the processor is formed of function unit 20 to which data is supplied by A bus 21 and B bus 22 and from which data is received by way of F bus 23. All data moves from the various registers through function unit 20. These respective buses are eight bits wide, which is the basic width of all syllables and data segments employed in the system. A bus 21 and B bus 22 receive information segments from the respective registers, and also from memory by way of U buffer register 24, which is also employed to supply eight-bit addresses to control memory 37. F bus 23 is coupled to I/O interface 23*a*, I/O address register 41, as well as to the respective registers as will be more thoroughly described below.

As was indicated above, machine instructions or S-instructions (which may be a higher level program language) are implemented by strings of micro instructions which are stored in main memory 11 of FIG. 1. The S-instructions and other data are also stored in memory 11. To this end, the respective instructions and data may be stored in different portions of a single read/write memory. However, in the preferred embodiment of the present invention, memory 11 of FIG. 1 is divided into separate portions (not shown) with a read/write portion being provided for S-instructions, some micro instructions and data, and a read-only portion being provided for the permanent storage of micro instructions to provide "bootstrap" facilities.

As was further indicated above, respective micro instructions are implemented by control instructions stored in control memory 37, which is internal to the processor, as indicated in FIG. 2. The control memory 37 may be integrated circuit read/write memory. However, in the embodiment of the present invention, control memory 37 is a read-only memory.

Figure 3:
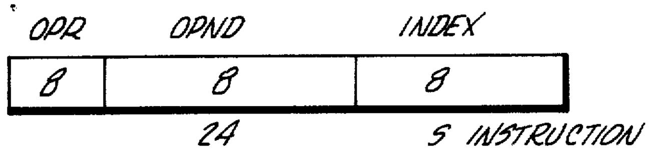
FIG. 3 is an illustration of the typical S-instruction format, as employed in the present invention.
Figure 4:
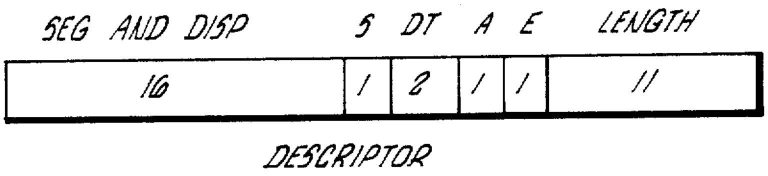
FIG. 4 is an illustration of a typical data descriptor format, as employed in the present invention.

The format of a typical S-instruction is illustrated in FIG. 3. The format as illustrated therein might consist of an eight -bit operator field, an eight-bit operand field, and an eight-bit index field. The contents of this operand field may be used to address a descriptor, which, in turn, can be combined with a similarly derived index to create an address to data in memory. The format of such a descriptor is illustrated in FIG. 4, and may include a sixteen-bit field specifying segment and displacement to define the location of the first data segment in the block of data being addressed, a one-bit field to specify whether the data is, for example, in ASCII or EBCDIC code, a one-bit field to specify the sign for four-bit numeric data and an 11-bit field to specify the length of data block being accessed.

Figure 5A:
FIGS. 5*a*, 5*b* and 5*c* are illustrations of the format for different types of micro instructions.

As was described above, the S-instructions are implemented by strings to micro instructions. In the present invention there may be three types of micro instructions whose formats are illustrated respectively in FIGS. 5*a*, 5*b* and 5*c*. FIG. 5*a* represents a type I micro instruction, which is a single character that "maps" on a one-to-one basis into control operators. In essence, this single character is an address to the control memory of the processor to select the respective control instruction that describes the functions associated with processor-memory, processor-I/O and the inter-processor transfers. A typical micro instruction of this type might be COPY MAR1 → MAR2.

Figure 5B:

FIG. 5b illustrates a type II micro instruction which is a multiple character micro instruction having a literal value "in-line" in micro memory 11 in which the literal value follows the eight-bit operator field or first character. The operator field of this type of micro instruction maps directly into a control operator to select data path execution count, functions and so forth, the length of the in-line literal being described by the execution count.

Figure 5C:
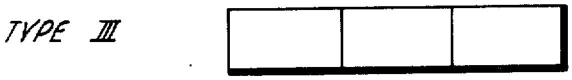

FIG. 5*c* illustrates a type III micro instruction which is a three character micro instruction used for jumps and subroutine jumps. The first eight bits describe the control operator associated with the micro instruction and the following two in-line characters represent the address parameters.

Figure 6:
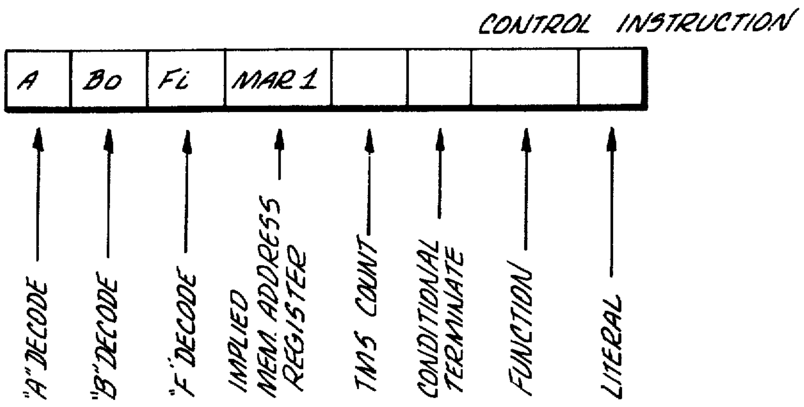
FIG. 6 is an illustration of the format of a control operator, or control instruction.

The first character, or operator field, of the various micro instructions is an address to the control memory to specify the location of a corresponding control instruction. The format of such a control instruction will now be described in reference with FIG. 6. As is illustrated therein that the control instruction contains a number of fields. The A decode field is a five-bit field describing the data path inputs to the A bus (21 in FIG. 2). The B decode field is a five-bit field describing the data path inputs to the B bus (22 of FIG. 2). The F decode field is a five-bit field describing the data path output from the F bus (23 of FIG. 2). The implied memory address field, of the format of FIG. 6, is a two-bit field to select an address register for addressing memory which selection may be MAR1 register 25 in an increment or decrement mode or MAR2 register 26 also in an increment or decrement mode (all registers and buses being shown in FIG. 2). The TMS load field, in FIG. 6, is a four-bit field to perform automatic execution count time selection for standard micro instructions. The conditional terminate field is a one-bit field to select conditional exits from micro instruction execution. The function field is a five-bit field to select arithmetic or logical operations in function unit 20 of FIG. 2. The literal field is an eight-bit field to permit literal values to be extracted from control instructions.

The type I micro instruction (one character) can specify one of 256 unique control operators. Type II and type III nicro instructions allow extension parameters to be provided by in-line literals in those micro instructions. The existence of dual timing machine state controls permit use of the TMS auxiliary register (40 in FIG. 2) to augment a micro instruction set by associate count times loaded by a previous micro instruction with existing control operators.

As was previously described, the system of the present invention is controlled by micro instructions that are, in turn, implemented by control instructions. That is to say all data moves are executed under the control of control instructions that have been called for by micro instructions. Since respective micro instructions might be made of a different number of syllables which must be fetched in sequence, the time required for fetching the variable syllable micro instruction itself varies as specified in the count field of the control instruction. Machine state control 39 (to be further described below) in FIG. 2 can specify one of eight different machine states, including two delay states, which are used in conjunction with the count fields of the control instructions to fetch micro operators and variable syllables. To this end, machine state control unit 39 is provided with a four-bit counter (not shown) to designate the micro instruction execution time. This counter is loaded from the count field of the control instructions. To accommodate the extended data transfers to or from the peripheral devices, and to and from memory, auxiliary machine state counter 40 is an eight-bit counter to specify up to 256 such data transfers. Up to 256 data segments thus can be transferred under the control of a single micro instruction. This feature might be employed, for example, in the compare operation to search a string of data segments for a particular value and the processor is adapted to conditionally halt the execution of that micro instruction should a compare have been achieved.

In order to reduce the time required for the execution of a number of micro instructions, micro instruction fetch is overlapped with micro instruction execution. A first-in, last-out push down stack (36a–d in FIG. 2) is provided to hold a series a micro memory addresses to expedite the fetching of jump or subroutine micro instructions.

DETAILED DESCRIPTION OF THE SYSTEM

As was described above, the system of the present invention was designed to provide for the flexible choice of language structures and input-output mechanisms, which system is nevertheless sufficiently free of fixed wired circuits so as to be competitive in cost with small special purpose and general purpose computers. In order to provide a more detailed description of the present invention, the system will now be described with reference to the drawings.

FIG. 2, as generally described above, is a diagram of the processor of the present invention. As shown therein, memory address registers 25 and 26 (MAR1 and MAR2 respectively) are identical sixteen-bit registers which operate in one of two modes: transfer and count. In the transfer mode, each register is arranged as two eight-bit byte registers (25*a*, 25*b* and 26*a*, 26*b* respectively) both capable of being loaded from function unit 20 by way of F bus 23. Each pair of byte registers can be concatenated into a two-byte register loaded from F bus 23. When in the transfer mode, and with no valid address loaded, a memory address register may be used as a general purpose register. When in the count mode, each of the memory address registers is employed to address memory. Memory address bus 44 is a sixteen-bit bus provided for this purpose. This allows up to 64K bytes of memory to be addressed. In the count mode, a memory address register (25 and 26 in FIG. 2) may be commanded to increment or decrement. The increment facility (25*c* and 26*c* in FIG. 2) is used to address sequential characters within memory, and the decrement facility mainly to address arithmetic information for correct presentation to processor.

BO register 27 is a single character general purpose register comprising two sections OU and OL to provide both byte and digit capability. In the digit mode, each digit may be combined with another digit in accordance with any function to be performed by function unit 20. In the byte mode, both digits in BO register 27 may be unloaded from function unit 20.

B1 register 28 is a single character register with bit masking facilities controlled by a literal value from control memory 38, and providing the capability of jump micro instructions on any bit in register 28, set or reset. In the transfer mode, the B1 register may be unloaded into function unit 20 and loaded from function unit 20. B2 registers 29*a* and B3 register 29*b* are single character general purpose registers which may be concatenated to form two-byte register 29. Each of the separate registers may be unloaded to function unit 20 and loaded from function unit 20.

WR register 34 is a general purpose working register with two modes of operation: transfer and bit. In the transfer mode, the WR register is arranged as two eight-bit byte registers (34*a* and 34*b*) each capable of being loaded from function unit 20. However, only lower byte register 34*a* can be unloaded to function unit 20. In the bit mode, WR register 34 is internally connected as a sixteen-bit serial shift register with shift off and recirculate capability. The shift amount is conditioned by a literal value placed into the controlling machine state counter, either the normal counter within the machine state control unit 39 or auxiliary machine state counter 40.

Flag register 30 is a single character register used as storage for a general flags byte. Bit setting is controlled by a literal value from control memory 37. In the transfer mode, register 30 may be unloaded to function unit 20 or may be loaded from function unit 20.

X registers 33*a*, 33*b*, 33*c* and 33*d* and Y registers 31*a*, 31*b*, 31*c* and 31*d* may be respectively concatenated together to form two four-byte registers, or may be concatenated together to form one eight-byte or sixteen digit register (XY). The respective registers may be loaded from function unit 20 and each unloaded to function unit 20. When employed in relation with function unit 20, these registers may perform decimal arithmetic. When in the digit mode, the XY combination of registers may be used for a zone stripping and appending.

Micro memory address registers 35*a* and 35*b* are a series of two one-byte registers capable of being loaded from or unloaded to function unit 20. These registers can also supply information to, and receive information from, three sixteen-bit registers 36*a*, 36*b* and 36*c*, which are arranged to form a push down or last in-first out (LIFO) address stack for addressing micro memory and storing program and interrupt subroutine addresses. Sixteen-bit counter 36*d* is also provided with increment capability and may be loaded directly from registers 35*a* and 35*b*. Micro memory address bus 45 is a sixteen-bit bus to receive addresses from stack register 36*c* and also from counter 36*d*. Counter 36*d* is coupled to increment unit 36*e* to provide increment capability.

TMS auxiliary register 40, which was briefly described above, is a single character register with two modes of operation: load and decrement. In the load mode, this register may be loaded from function unit 20. Control for the next succeeding micro instruction is transferred to this register from machine state counter in TMS control unit 39. In the decrement mode, TMS auxiliary register 40 controls the termination of the current micro instruction execution if preconditioned by a load TMS auxiliary micro instruction.

I-O address register 41 is an eight-bit register used to address eight bi-directional I-O channels or control units. This register may be loaded from function unit 20 and may unload to function unit 20.

Function unit 20 consists of two arithmetic logic units having the functional capability listed below. The function unit data paths are eight bits wide in conformance with the data path width of the widths of the input and output buses (A bus 21, B bus 22 and F bus 23). The table below lists the resultant output F as a function of the two inputs A and B. Additional functional capabilities such as decimal (BCD) arithmetic, tens' complement, and zone appending are provided by data path selection and the use of micro instruction literals. Function unit 20 is an eight-bit wide arithmetic logic unit which may be of the type disclosed in the Mott, et al U.S. Pat. No. 3,319,226, which patent issued May 9, 1967 and is assigned to assignee on the present invention.

| CONTROL CODE | FUNCTION |
|---|---|
| 11111 | TRANSFER A |
| 00001 | INVERT A |
| 10111 | LOGICAL 'AND' A.B |

-continued

| CONTROL CODE | FUNCTION |
|---|---|
| 11101 | LOGICAL 'OR' A + B |
| 01101 | EXCLUSIVE 'OR' $A \oplus B$ |
| 10010 | BINARY ADD A PLUS B |
| 00000 | BINARY INCREMENT A |
| 11110 | A MINUS 1 |
| 01100 | A MINUS B MINUS 1 |
| 00100 | $(A + \bar{B})$ |
| 00111 | ZERO |
| 00011 | A + B |
| 00101 | $\bar{A} - B$ |
| 01001 | A.B |
| 01011 | $\bar{B}$ |
| 01111 | $A.\bar{B}$ |
| 10001 | $\bar{A} + B$ |
| 10011 | $A \oplus B$ |
| 10101 | TRANSFER 8 |
| 11001 | 1 |
| 11011 | $A + \bar{B}$ |
| 00010 | A + B |
| 11010 | (A + B) PLUS A |
| 00110 | MINUS 1 |
| 01000 | A PLUS $A.\bar{B}$ |
| 01010 | (A + B) PLUS $A.\bar{B}$ |
| 01110 | A.B MINUS 1 |
| 10000 | A PLUS A.B |
| 10100 | $(A + \bar{B})$ PLUS A.B |
| 10110 | A.B. MINUS 1 |
| 11000 | A PLUS A |
| 11100 | $(A + \bar{B})$ PLUS A |

The portion of the processor described therefor includes the register organization and the function unit. A detailed description will now be provided for the micro instruction decode organization which includes U buffer register 24 and control memory 37, as well as the machine state control unit 39, as illustrated in FIG. 2.

U buffer register 24 is an eight-bit register used for addressing control memory 37 and for providing information about the next micro instruction to be executed. This information is required to generate overlap of the micro instruction fetch and execution phases. Upon the accessing of control memory 37, a control instruction is supplied to control buffer register 38. Buffer register 38 may be of a type of buffer register such as disclosed in Beers, et al U.S. Pat. No. 3,735,363, issued May 22, 1973, which register is adapted to hold the signals of a control instruction during the execution time required therefor. As was generally described above, the contents of control buffer 38 (that is to say, the control instruction) controls the selection of the source and destination registers and the function to be performed.

Machine state control unit 39 controls the phasing of all micro instructions in the processor. (The respective machine states are more thoroughly described below). Machine state control unit 39 may be of a type employed in the Burroughs L5000 business minicomputer and described in Burroughs L5000 Technical Manual, copyrighted 1970, Burroughs Corporation. A look-ahead technique is employed in the micro instruction decode as is overlap of the fetch and execution phases of the micro instruction execution which is described below in relation to FIG. 9. The look-ahead function involves a decision on the current micro instruction machine state and count time, the type of the current micro instruction obtained from the control instruction from the control memory, and the type of the next micro instruction contained in U buffer register 24, if the contents of that register have been declared valid, i.e. a micro operator syllable is present. The machine state during the next count time of the processor is computed and decisions are made on whether to address memory and request memory access, to fetch the next micro instruction and increment the micro memory address register, and to declare the contents of the U buffer register 24 to be valid. As was indicated above, machine state control unit 39 includes a four-bit counter (not shown) which is preset from the control instruction and controls the number of execution periods for the current micro instruction (except when TMS auxiliary register 40 has been enabled by the previous micro instruction).

The TMS auxiliary register 40 is employed to control the transfer of a number of the data segments (up to 256 bytes) under the control of a single micro instruction. Such multi-segment transfers may be to or from main memory 11 of FIG. 1, or to or from the I-O periphery. Furthermore, a conditional terminate micro instruction is provided under which the data string being transferred is scanned for comparison with the value of the contents of one of the data registers and, should a comparison occur, the micro instruction terminates and machine state control is transferred back to the four-bit counter (not shown) in machine state control unit 39.

Figure 7:
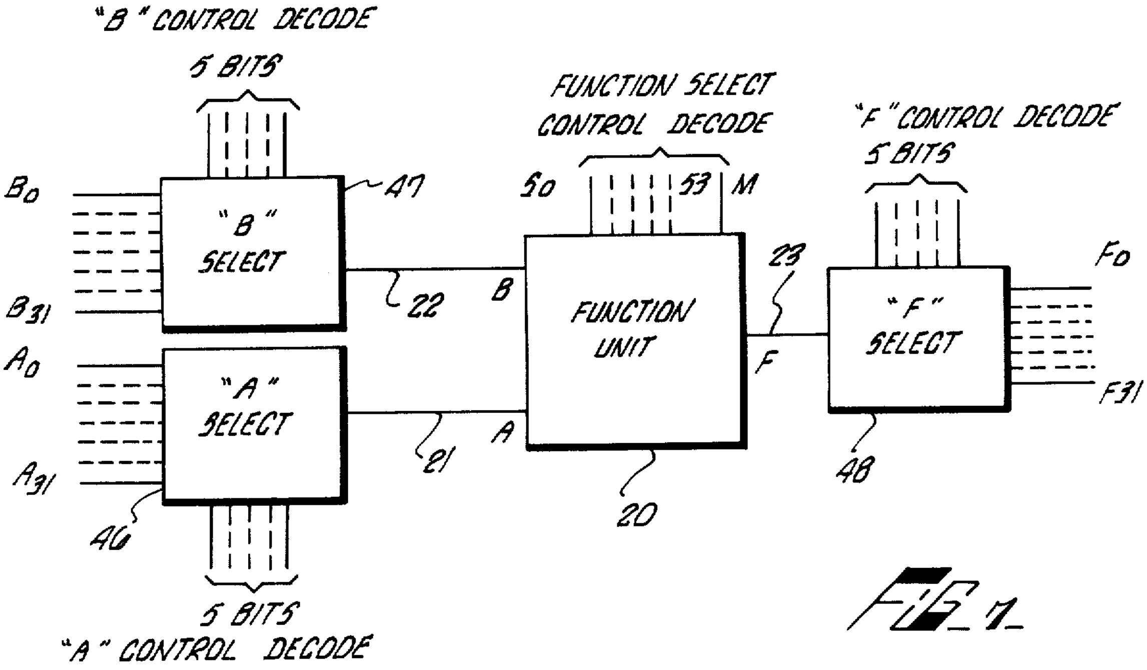
FIG. 7 is a schematic diagram of the data select netwroks for the various data registers of the present invention.
Figure 9:
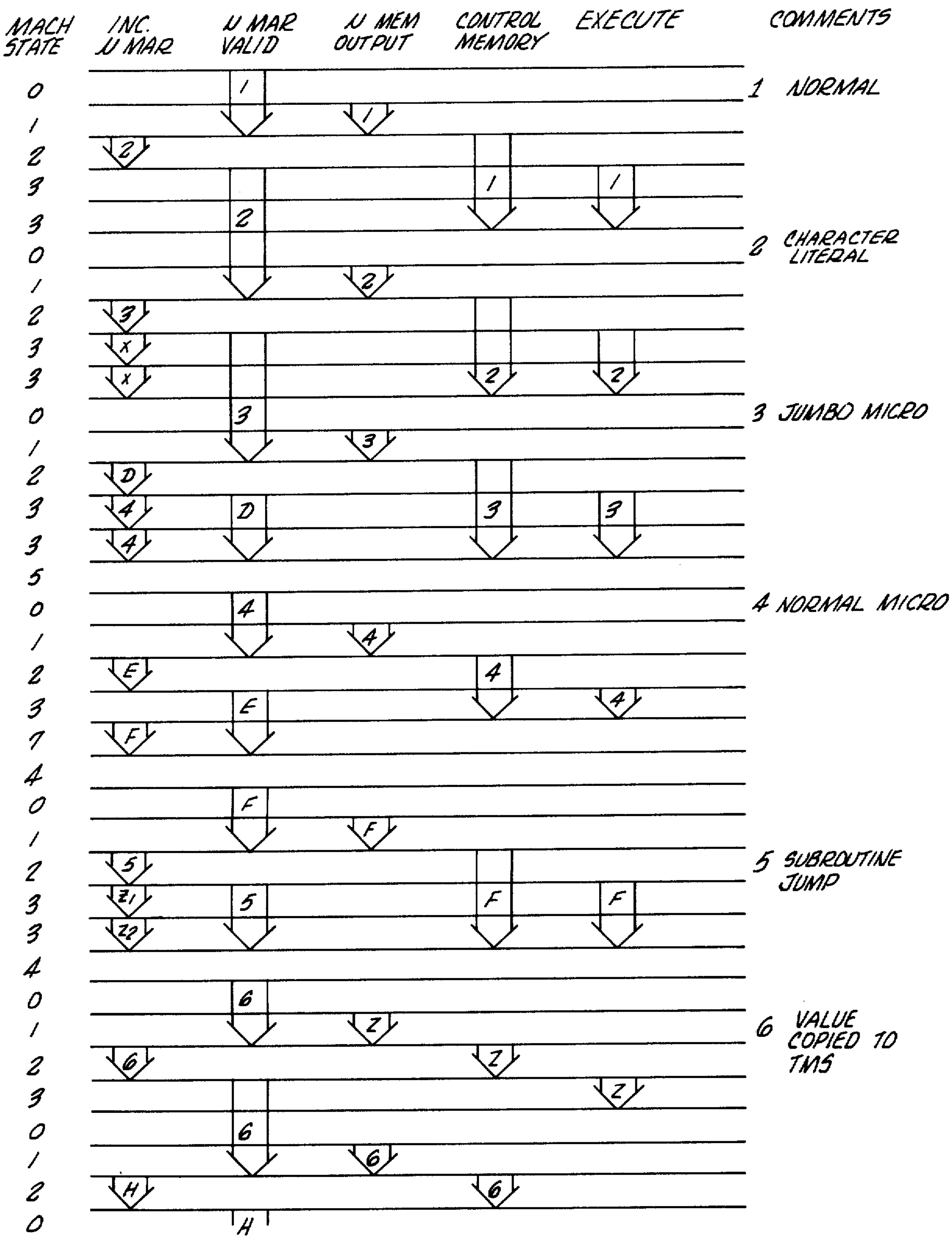
FIG. 9 is a timing diagram of micro instruction fetch operation.

The manner in which a control instruction selects the individual source and destination registers, as well as the function to be performed, will now be described in relation to FIG. 7, which is a schematic diagram of the A, B and F select networks. As was described above, the control instruction contains three five-bit fields to specify respectively the register to be coupled to the A bus 21 (see also FIG. 2), the register to be coupled to the B bus 22 and the register to be coupled to the F bus 23. In addition, the control instruction contains a five-bit field to specify the arithmetic or logic operation to be performed by function unit 20. These respective fields are received by control buffer 38 of FIG. 2, and are transferred to the respective select networks as illustrated in FIG. 7. The A decode field is transferred to the A select network 46 to connect the particular specified register to A bus 21. The B decode field is transferred to the B select network 47 to connect the particular specified register to B bus 22 and F control field is transferred to the F select network 48 to specify which register is to be coupled to F bus 23. The function select decode field is transferred directly to function unit 20. All of the fields may be selected independently of each other. FIG. 9 is a timing chart where there is parallelism or overlap between micro memory address incrementation and micro instruction execution, but there is no overlap between micro memory fetch and the micro instruction execution. That is to say in FIG. 9 there is no overlap between micro instruction fetch from the micro portion of main memory and control instruction fetch from the control memory.

As was described above in regard to the micro instruction execution organization, machine state control unit 39 (see FIG. 2) controls the phasing of all micro instructions in the processor. As was further described above, a look-ahead technique is employed which involves a decision on the current micro instruction machine state count time, the type of the current micro instruction obtained from the state machine decode field in the control instruction, and the type of the next micro instruction contained in U buffer register 24 (see FIG. 2) as received from micro instruction memory. The implementation of the instruction look-ahead technique may be similar to that disclosed in the Barnes, et al U.S. Pat. No. 3,401,376 which patent issued Sept. 10, 1968 and is assigned to the assignee of the present invention. The machine state during the next count time of the machine is computed and decisions are made on whether to address memory and request memory access, to fetch the next micro instruction and increment the micro memory address register and to declare the U buffer register valid.

Figure 8:
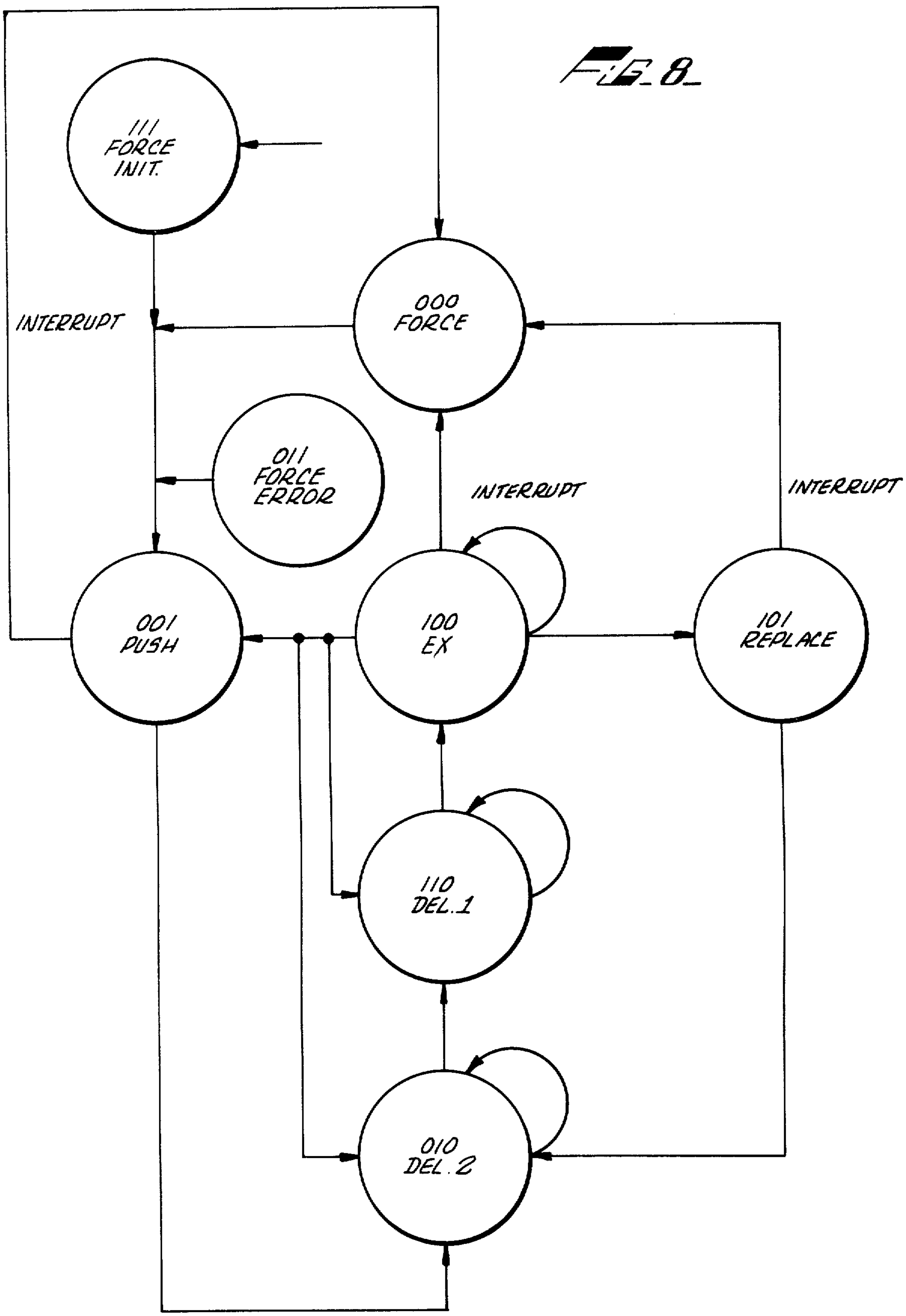
FIG. 8 is a state diagram illustrating the relation between the various machine states of the present invention.

There are eight different machine states and the relation between those states is illustrated in FIG. 8. These respective states are denoted as force-initiate (111), force-interrupt (000), force-error (011), push (001), replace (101), execute (100), delay 1 (110) and delay 2 (010). The conditions under which each of the states is entered and the function of that state will now be discussed.

The function of the push state (001) in the processor is to manipulate the micro memory address register and associated stack such that subroutine jump addresses and interrupt return addresses are saved in the stack. The conditions for entry to the push state exist when the current micro instruction is a satisfied subroutine jump in count time 1 of the execute state, or else when a force-interrupt condition, a force initialize condition or a force-error condition is valid during the current machine cycle.

The function of the replace state (101) is to cause unconditional jump addresses and satisfied conditional jump addresses to be loaded from the load register in the micro memory address stack to the micro memory address register. The conditions for entry to the replace state exists when the current micro instruction is a satisfied jump but not a subroutine or a subroutine return and when the current micro instruction is in count time 1 of the execute state.

The force-interrupt state is to cause a force micro program routine address to be loaded into the micro memory address stack. When an interrupt occurs, condition for entry to the force-interrupt state exists when the current state machine is either push or replace; the current micro instruction is a non jump TNS load in count time 1 of the execute state and the contents of the micro buffer are invalid; the current micro instruction is a satisfied conditional read in the execute state but not in count time 1 of that state and again the contents of the micro buffer have been declared invalid; the current micro instruction is a subroutine return in count time 1 of the execute state.

The force-initialize state (111) is entered upon receipt by the processor of a power on signal. The force-error state (011) is entered upon detection of a parity fault from memory when a memory enable line to the processor has indicated that a memory access has been granted to the processor.

The delay 2 state is provided in order to permit the fetching of a micro instruction in the micro portion of memory and to be loaded into the micro buffer if the previous micro instruction just executed is either a satisfied conditional jump, an unconditional jump, a subroutine jump, or subroutine return. The delay 2 state may only be entered if no interrupt is present and when the current state of the micro processor is either push or replace; the current micro instruction is a subroutine return in the execute state; the current micro instruction is a satisfied conditional read in the execute state but not in count time 1 of that state.

The delay 1 state (110) is provided for two purposes. The more important purpose is to cause the micro instruction currently in the micro buffer to be brought forward through the control memory into the control buffer prior to execution. The remaining application of the delay 1 state is necessitated by the memory access time on read micro instructions since it is impossible for a character in memory, addressed by one of the MAR registers, to be accessed and brought out to the processor storage registers in the same cycle. In this case, the delay 1 state is provided to access the first character required in any memory read micro instruction prior to the processor entry to the execute state.

The execute state (100) controls all transfers of data within the processor other than those stack manipulations controlled by the replace, force, and push state.

A regular micro instruction not requiring memory access can be executed in one clock time and no associated delays are required. A memory write micro instruction requires a one clock delay after the execution has been terminated. A memory read instruction requires a one clock time delay before execution, and a one clock time delay after execution. A literal micro instruction requires a one clock time delay after execution has been terminated to allow for fetch of the next micro syllable as was described above.

A jump unconditional micro instruction and a jump conditional satisfied micro instruction require two clock time delays after execution has been terminated. A jump conditional unsatisfied micro instruction requires one clock time delay after execution has been terminated. A memory read conditional terminate micro instruction requires a one clock time delay before execution is initiated and a two clock time delay after execution has been completed.

The input-output interface of the processor, as shown in FIG. 2, comprise I-O data bus 23*a*, I-O address register 41, I-O request bus 42, I-O address bus 43 and mask register 46. These facilities can service eight channels having bi-directional capability and program controlled priority. All transfers through an I-O channel are under processor control. Control parameters, data, and identification and status requests, may be transmitted from a processor to an I-O channel controller; and status, identification, and data are passed from the controller to the processor. All data transfers initiated by a processor access the processor via an I-O interrupt request; control, identification and status information may be transferred only by a processor command. Using the data interrupt request facility all of the eight I-O channels may operate concurrently.

The I-O data bus 23*a* has associated with it a number of service lines which include a channel address line, a channel request line and input-output execute line, a control line, a two-phase clock line, a power-on line, and a direction line. The data bus itself consists of eight bi-directional data lines.

A unique channel address line is provided for each channel addressed by the processor. An appropriate line is raised any time communication with a particular channel is required. When a particular channel address line has been raised, that channel's data bus may be connected to the processor's data bus 23*a*.

A channel request line is provided between each channel and processor, a particular channel request line being raised when its corresponding channel requires service. All eight I-O channel request lines are logically "OR"ed together to form an I-O interrupt request to the processor machine state control 39 (in FIG. 2). Requests are interrogated by the processor to determine channel priority. A channel's request line is used by the I-O device controller to inform the processor that, a data command from the processor has been satisfied and data transfers are requested, a device has gone "not ready" while selected, or a device has gone "ready" while deselected. Function of the request line in this manner permits a processor to perform other processing tasks after passing a command to the I-O controller and while waiting for the controller to request servicing as a result of the command.

The input-output execute line controls all transfers of information and data between the processor and I-O controller. This line remains raised during the execution by a micro instruction of any information transfer in an I-O channel and acts as an enable signal to the system transfer clocks.

The control line of the I-O interface is raised by the processor to indicate to the addressed channel that command or control information is being transferred through the channel.

The power-on line is employed to initialize the conditions of a particular device on each I-O channel.

The direction line is used to indicate the current data transfer direction on the bi-directional data lines. When that direction is into the processor, and the above-described control line is raised, a primary status character of an I-O device is transferred to the processor.

Five types of operations may be performed across the I-O interface. They are respectively called "interrogate status", "electronic command I", "electronic command II", "peripheral timing sensitive" command and "data transfer".

The "interrogate status" command operates in an unusual manner on the system in that status information collected into a single byte by a peripheral controller may be transferred to the processor or memory during the same cycle as an interrogate request action is performed by the processor. A status character in a peripheral controller is addressed by any processor micro instruction causing the above-described control line to be raised and the direction line to be lowered across the interface between the processor and the peripheral controller.

The "electronic command I" is of the type where there is no immediately succeeding data transfer as a result. This first type of "electronic command" causes an action in the peripheral controller which does not prepare the controller for a data transfer in the next cycle. Examples of this type are "select to read", "set mode", and "deselect".

The "electronic command II" is one where the next I-O transfer to or from the commanded peripheral device must involve a processor register which is conditioned by this command. This type of command causes a register in a peripheral controller to be preconditioned such that the next I-O data transfer to the controller either writes data to that register or reads data from that register to the processor memory. A data transfer succeeding the command may occur after a number of cycles' delay. The processor insures that any data requests as the result of "select to read" or "select to write" commands are inhibited until the data transfer condition by a "electronic command II" type is executed.

The "peripheral timing sensitive" type of command may be executed in two ways. One of these ways is by including that command in the data stream to a peripheral. In this case, a command is treated as data by the peripheral controller and termination of the command is signified to the processor by the peripheral causing its request line to be raised. The second manner in which this type of command can be used is by using the above-described control and direction line to indicate a control character transfer.

The "data transfer" type of command includes "select to read" and "select to write" commands to control information transfer. The "select to read" command initiates transfer of data being read from the peripheral. The "select to write" initiates the transfer data to be written to a peripheral from the processor. Controllers may be defined as block transfer or single character transfer controllers. When a block or character transfer is required after selection, the peripheral controller raises its request line to the processor. The processor responds to this request by lowering the control line (described above) and raising the I-O execute line (described above) for the duration of the transfer. The direction line associated with data bus 23*a* (see FIG. 2) is lowered for the reading of data from the peripheral and is raised for the writing of data to the peripheral from the processor. The processor signifies the end of a data transfer by placing a "response" code on the I-O data bus after the transfer of the last character in a block. The peripheral controller must then lower its request line until it is capable of further data transfer.

Information transfers under control of the "peripheral timing sensitive" and "data transfer" type of commands are subject to interrupt control in the processor. The interrupt control exists in the machine state control 39 of FIG. 2 and provides the capability of accepting eight bi-directional I-O channel requests and enabling their input to the processor by the generation of an "interrupt enable" flag or signal. Circuitry for accepting terminal requests and enabling their input may be of the type disclosed in the Macker et al U.S. Pat No. 3,728,693, which patent issued Apr. 17, 1973, and now assigned to the assignee of the present application. When the interrupt enable flag has been set at a logical "1", it permits any request from a peripheral to take control of the micro processor by causing the machine state control 39 in FIG. 2 to enter the force state as was described above in regard to the various machine states. While the processor is in the force state, the interrupt enable flag is reset to a logical "0" so that no futher interrupts may be generated while the processor is servicing the first interrupt. After servicing the interrupt, the processor must set the interrupt enable flag to a logical "1" to again permit channel requests to be serviced. This is achieved by the processor programming an interrupt return micro instruction which sets the interrupt enable flag and restores micro program control to the micro instruction succeeding the one being executed when the interrupt occurred. The interrupt enable flag may also be set programmatically to a logical "0" by use of a special subroutine jump micro instruction.

The function of the force interrupt state (described above) is to load a fixed address, the start address of the peripheral handler routines, into the micro memory address stack and to copy the normal carry flag to the interrupt carry flag. On an interrupt return micro instruction, the interrupt carry is copied to the jump carry flag.

Figure 10:
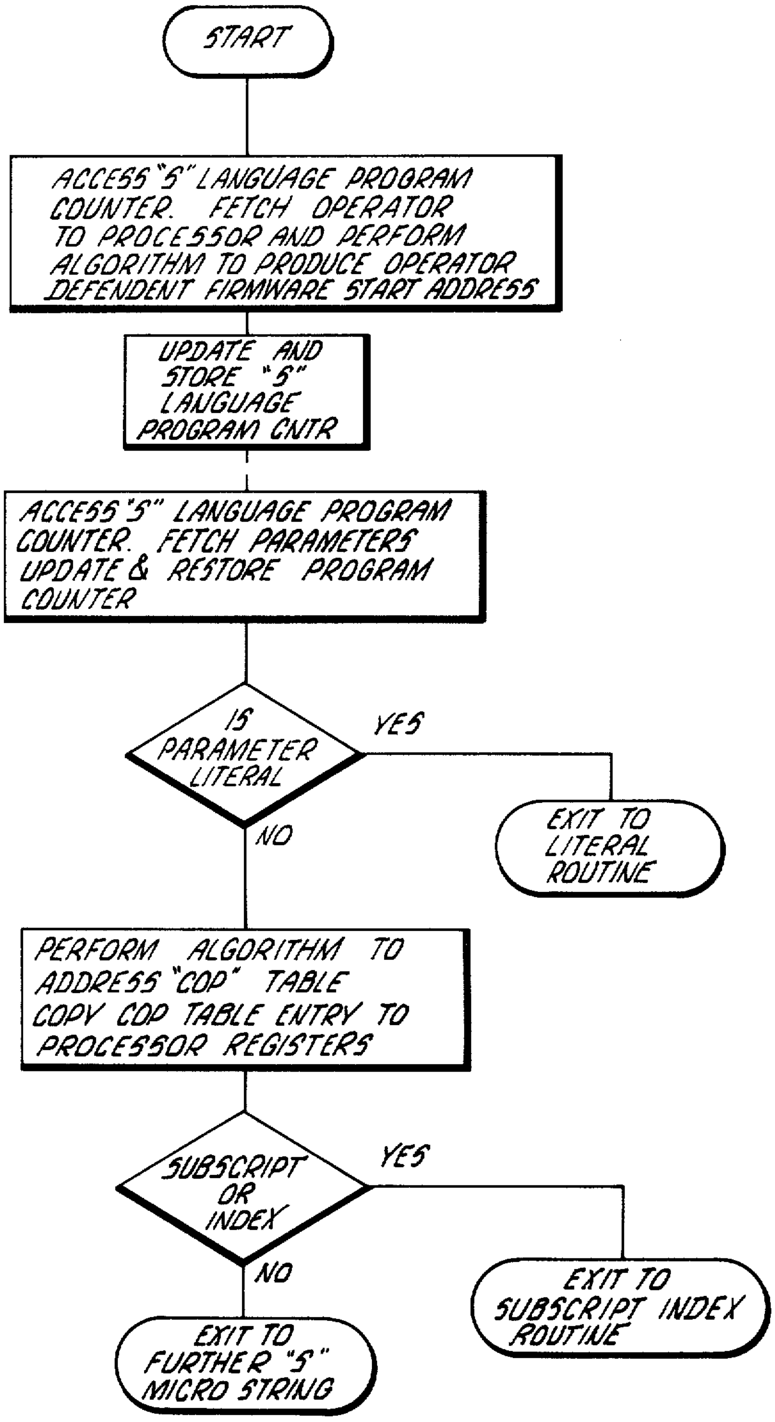
FIG. 10 illustrates a flow chart describing operator and parameter fetch mechanism for interpretation as employed by the present invention.
Figure 11:
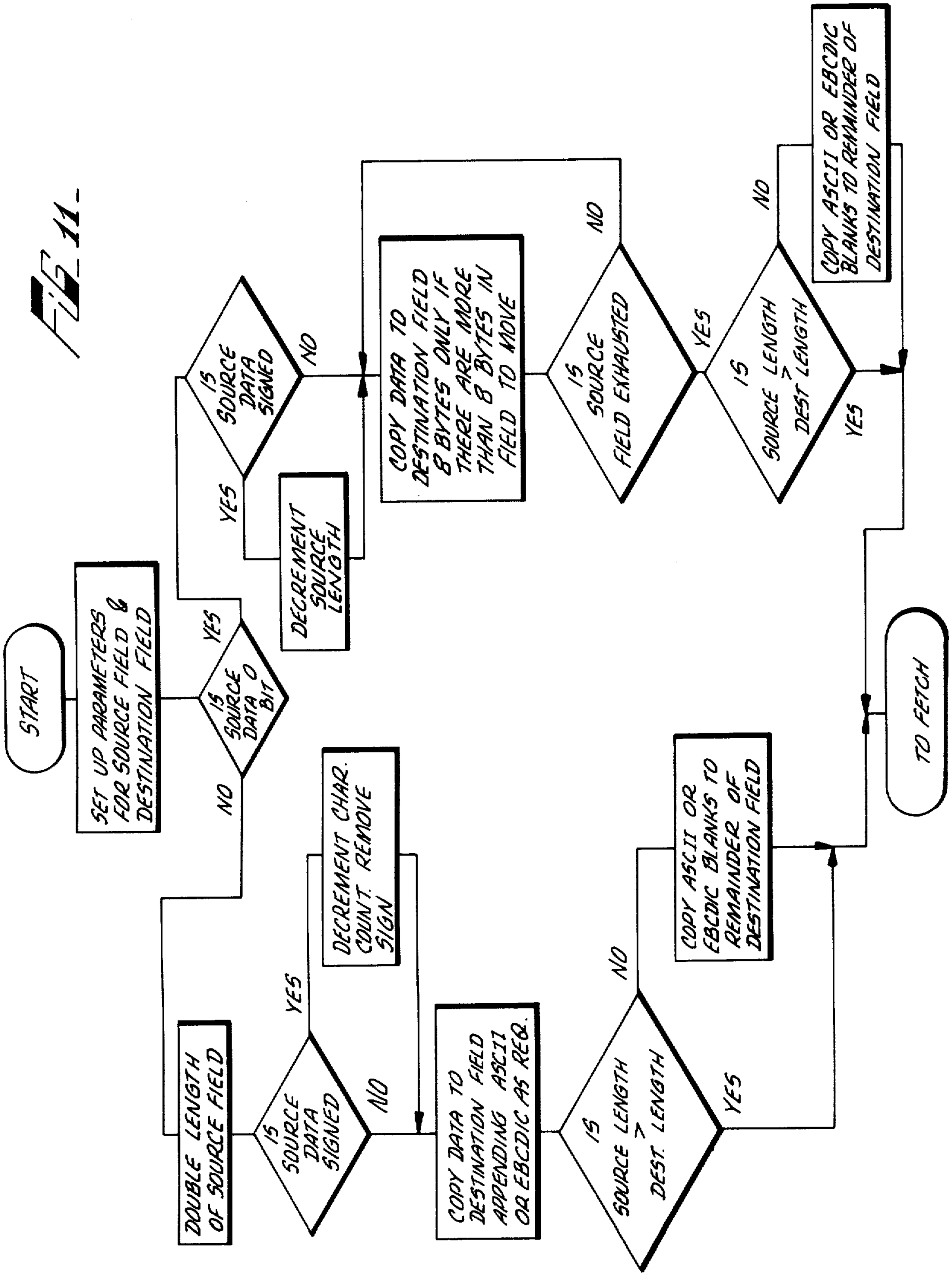
FIG. 11 illustrates a flow chart describing alphanumeric moves as achieved by the system of the present invention.

The processor of the present invention, its functional units and the manner in which micro instructions are fetched and executed in an overlapped manner have now been discussed. As was described above in the background of the invention, an object of the present invention is to provide an inexpensive data processor that can nevertheless accommodate programs written in higher level program languages. Furthermore, another object of the present invention is to provide a data processor having relatively inexpensive micro instruction memory requirement so as to meet the market needs for present-day electronic accounting and billing machines. Such machines must be particularly adept at alpha-numeric moves, or the transfer and processing of alpha-numeric data. To illustrate that the processor of the present invention fulfills the above stated objects, two flow charts will now be described with reference to FIGS. 10 and 11. FIG. 10 illustrates the flow chart describing operator and parameter fetch mechanisms for the interpretation of higher level languages or S-languages. FIG. 11 illustrates the flow chart describing alpha-numeric moves.

Interpretation of programs written in a higher level language (either by the particular processor on which the programs are to be run or interpretation of programs written for other processors than the processor on which the program is to be run) is readily accommodated by variable micro programming of the type employed in the present invention. The execution of programs in higher level program languages by non-interpretive processors is accommodated only by first compiling the higher level language program into the particular machine language of the non-interpretive processor and it is the machine language program which is then run on that processor at a later time. Interpretation is distinguishable from compilation in that the interpretative process replaces the sequence of compilation and subsequent execution and runs the program directly in its higher level language form by interpretation or implementation of the higher level langauge instructions by strings of micro code.

As illustrated in FIG. 10, the interpreter operators and parameters are fetched by a process which first accesses the S-language program counter, which is stored in memory, and employs the contents thereof to fetch the interpreter operator to the processor. From that operator the operator dependent firmware start address is generated. The S-language program counter is updated. The contents of the S-language program counter are then employed to fetch from memory the parameters required by the S-language program. The S-language program counter is then again updated and restored in memory. Each parameter is then tested to see if it is a literal. If it is, the routine exits to a special literal routine provided. If the parameter is not a literal, it is employed to access a table in memory to fetch a descriptor. If that descriptor includes a subscript or index flag, the routine then exits to a special subscript/index routine. If such a subscript or index flag is not present, then the descriptor is employed to address the particular micro string, or string of micro code, required in order to implement the current S-language instructions.

FIG. 11 illustrates the manner in which descriptors are evaluated for alpha-numeric moves. The process includes the set up of the parameters required to specify the source and destination fields. If the source data is not eight bits in type, then it is a digit source field. If the source data is signed, it is decremented by one character to remove the sign, and the data is copied to the destination field with either ASCII or EBCDIC formats appended as required. If the source length is not greater than the destination length, ASCII or EBCDIC blanks are copied to the remainder of the destination field, and the routine exits to a new fetch routine.

If the source data was eight bit type, but is signed, it is decremented to remove the sign designation. The data is then copied to the destination field eight bytes at a time, if there are more than eight bytes in the field to move. The source field is then checked to see if it is exhausted and if not, additional bytes are copied to the destination field. If the source length is not greater than the destination length, ASCII or EBCDIC blanks are copied to the remainder of the destination field and the routine exits to a new fetch routine.

As has been consistently described throughout this specification, the various memory fetches and data transfers, such as required for the routines of FIGS. 10 and 11, are carried out under the control of micro instructions that are fetched from the micro memory portion of the main memory and are implemented by control instructions fetched from the control memory which is internal to the processor. The control instructions are just those sets of control signals required to condition the various gates for data transfer, increment the respective counters and so forth.

EPILOGUE

A system and method employed by that system have been described which can accommodate programs written in various higher level program languages without undue limitations being encountered due to the structures of particular ones of those higher level languages. Furthermore, the system and method employed thereby are designed to be cost competitive with other small general purpose processing systems and special purpose computers, and also to be performance competitive with medium sized micro program systems. Variable micro program systems maintain an advantage over non-micro program systems in their ability to readily interpret the plurality of different higher level program languages through the implementation thereof by different strings of micro code or micro instructions.

To achieve the above-stated design goals, the present system and the method employed thereby are adapted to employ plural levels of subinstruction sets to implement the higher level instruction sets representing the different programs. The respective levels of subinstruction sets are the conventional micro instructions and also control instructions, the latter of which are the sets of control signals required to condition the various gates for data transfers and other operations. The format of the micro instruction can be varied to comprise different numbers of basic syllables which are then fetched sequentially from the micro memory to form the desired micro instruction. In this manner, redundant storage requirements of the micro instruction memory are considerably reduced.

While but one embodiment of the present invention has been described and illustrated, it will be obvious to one skilled in the art that changes and modifications may be made therein without departing from the spirit and scope of the invention as claimed.

What is claimed is:

1. A data processing system including a processor having a fixed data path width and a memory having a first portion to store macro instructions and data and a second portion to store different types of micro instruction syllables, each syllable having a width equal to said fixed data path width, said processor comprising:

a function unit to perform logical operations on data;

a plurality of registers coupled to said function unit for data transfer therebetween;

macro instruction accessing means coupled to said memory to receive macro instruction operators from said first memory portion; and micro instruction accessing means coupled to said function unit and said registers, said micro instruction accessing means also being coupled to said macro instruction accessing means and to said second memory portion and responsive to said macro instruction operator to access, in sequence, two or more micro instruction syllables from said second portion of said memory so as to form a micro instruction called for by said macro instruction operator wherein the first syllable of said micro instruction specifies a logical operation to be performed by said function unit and the particular ones of said plurality of registers for data transfer to said function unit and the remaining syllables specify literal values.

2. A system according to claim 1 wherein:

the second portion of said memory is a read-only memory.

3. A data processing system including a processor having a fixed data path width and a memory having a first portion to store macro instructions and data and a second portion to store different types of micro instruction syllables, each syllable having a width equal to said fixed data path width, said processor comprising:

a function unit to perform logical operations on data;

a plurality of registers coupled to said function unit for data transfer therebetween;

macro instruction accessing means coupled to said memory to receive macro instruction operators from said first memory portion;

micro instruction accessing means coupled to said macro instruction accessing means and to said second memory portion and responsive to said macro instruction operator to access, in sequence, two or more micro instruction syllables from said second portion of said memory so as to form a micro instruction called for by said macro instruction operator wherein the first syllable of said micro instruction specifies a logical operation to be performed by said function unit and the particular ones of said plurality of registers for data transfer to said function unit and the remaining syllables specify literal values; and a control memory coupled to said function unit and said registers and also to said micro instruction accessing means, said control memory containing control instructions individually selectable from said control memory in response to the first micro instruction syllable of a micro instruction to initiate data transfer between individual ones of said registers and said function unit such that there is a unique micro instruction syllable to specify each combination of registers to be employed and the logical operation to be performed.

4. A data processing system including a processor having a fixed data path width and a memory to store different types of micro instruction syllables, each having a width equal to said fixed data path width, said processor comprising:

a function unit to perform logical operations on data;

a plurality of registers coupled to said function unit for data transfer therebetween;

micro instruction accessing means coupled to said memory to access in sequence two or more micro instruction syllables from said memory so as to form a micro instruction wherein the first syllable of said micro instruction specifies a logical operation to be performed by said function unit and the particular ones of said plurality of registers for data transfer to said function unit and the remaining syllables specify literal values; and a control memory coupled to said function unit and said registers and also to said micro instruction accessing means, said control memory containing control instructions individually selectable from said control memory in response to the first micro instruction syllable of a micro instruction to initiate data transfer between individual ones of said registers and said function unit such that there is a unique micro instruction syllable to specify each combination of registers to be employed and the logical operation to be performed.

* * * * *

UNITED STATES PATENT OFFICE

CERTIFICATE OF CORRECTION

Patent No. 3,930,236 Dated December 30, 1975

Inventor(s) Alisdair Cullen Ferguson, John McGregor, Alastair George MacPherson

It is certified that error appears in the above-identified patent and that said Letters Patent are hereby corrected as shown below:

Col. 1, line 51, change "system's change as" to read --system's change has--.
Col. 2, line 40, change "that format cna" to read --that format can--.
Col. 5, line 41, change "by strings to" to read --by strings of--.
Col. 6, line 29, change "type III nicro" to read --type III micro--.
Col. 14, line 41, change "now assigned" to read --is assigned--.
Col. 14, line 49, change "futher interrupts" to read --further interrupts--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*